US009107049B2

(12) United States Patent
Lindsay et al.

(10) Patent No.: US 9,107,049 B2
(45) Date of Patent: Aug. 11, 2015

(54) ADVANCED REAL-TIME IP COMMUNICATION IN A MOBILE TERMINAL

(71) Applicant: D2 Technologies Inc., Santa Barbara, CA (US)

(72) Inventors: David Lindsay, Santa Barbara, CA (US); Steve Parrish, Algonquin, IL (US); Christopher Garrido, San Jose, CA (US); Matthew Randmaa, Santa Barbara, CA (US)

(73) Assignee: D2 Technologies, Inc., Santa Barbara, CA (US)

( * ) Notice: Subject to any disclaimer, the term of this patent is extended or adjusted under 35 U.S.C. 154(b) by 114 days.

(21) Appl. No.: 13/891,197

(22) Filed: May 10, 2013

(65) Prior Publication Data

US 2013/0301529 A1   Nov. 14, 2013

Related U.S. Application Data

(60) Provisional application No. 61/645,635, filed on May 11, 2012.

(51) Int. Cl.
*H04W 4/12* (2009.01)
*H04W 4/00* (2009.01)
*H04W 4/14* (2009.01)

(52) U.S. Cl.
CPC ............... *H04W 4/12* (2013.01); *H04W 4/003* (2013.01); *H04W 4/14* (2013.01)

(58) Field of Classification Search
USPC .......... 370/252–311, 328–331; 455/437–466, 455/507–522, 552; 709/206–217
See application file for complete search history.

(56) References Cited

U.S. PATENT DOCUMENTS 6,976,092 B1   12/2005   Daniell et al.
7,039,710 B2   5/2006    Khartabil
(Continued)

FOREIGN PATENT DOCUMENTS

CN   104219736   12/2014
EP   2663054     11/2013
(Continued)

OTHER PUBLICATIONS

"Pidgin-facebookchat Facebook Chat Plugin for Pidggin." http://www.code.google.com/p/pidgin-facebookchat/wiki/How_To_Install. Last accessed Feb. 2, 2009. (3 pgs).
(Continued)

*Primary Examiner* — Man Phan
(74) *Attorney, Agent, or Firm* — Carr & Ferrell LLP

(57) ABSTRACT

A method of making Voice over Internet Protocol (VoIP) calls, legacy circuit calls, sending/receiving Short Message Service (SMS) over Long Term Evolution (LTE) modem or a legacy modem on a mobile terminal with both kinds of modems, and providing all legacy modem functions is disclosed. In addition, methods for dynamic selection of radio in a mobile terminal capable of Rich Communications Services (RCS) capabilities, and a method for redirecting RCS traffic to an alternate network interface is also disclosed. Methods for Session Initiation Protocol module (SIP) stack functions to be distributed across different processors on a mobile terminal, and directed to different network interfaces is disclosed. Methods of adding video calling and RCS functions without encountering the dual registration problem are also disclosed.

13 Claims, 6 Drawing Sheets

(56) References Cited

U.S. PATENT DOCUMENTS

| | | | |
|---|---|---|---|
| 7,315,613 | B2 | 1/2008 | Kleindienst et al. |
| 7,433,455 | B1 | 10/2008 | Oran |
| 8,199,719 | B2* | 6/2012 | Taneja ............ 370/331 |
| 8,208,944 | B2* | 6/2012 | Kim et al. .......... 455/456.1 |
| 8,369,253 | B2* | 2/2013 | Faccin et al. ......... 370/310.2 |
| 8,611,947 | B2 | 12/2013 | Mednieks et al. |
| 8,649,291 | B2* | 2/2014 | Wang et al. ............ 370/254 |
| 8,676,251 | B2* | 3/2014 | Park et al. ........... 455/552.1 |
| 8,676,252 | B2* | 3/2014 | Noh et al. ........... 455/552.1 |
| 2002/0039149 | A1 | 4/2002 | Perez |
| 2003/0095567 | A1 | 5/2003 | Lo et al. |
| 2004/0015547 | A1 | 1/2004 | Griffin et al. |
| 2004/0054735 | A1 | 3/2004 | Daniell et al. |
| 2005/0020250 | A1 | 1/2005 | Chaddha et al. |
| 2006/0003745 | A1 | 1/2006 | Gogic |
| 2006/0045124 | A1 | 3/2006 | Dahlstrom et al. |
| 2006/0156251 | A1 | 7/2006 | Suhail et al. |
| 2006/0227950 | A1 | 10/2006 | Mielich et al. |
| 2007/0173283 | A1 | 7/2007 | Livet et al. |
| 2007/0192325 | A1 | 8/2007 | Morris |
| 2007/0223462 | A1 | 9/2007 | Hite et al. |
| 2008/0261569 | A1 | 10/2008 | Britt et al. |
| 2009/0111509 | A1 | 4/2009 | Mednieks et al. |
| 2009/0113460 | A1 | 4/2009 | Parrish et al. |
| 2011/0110256 | A1* | 5/2011 | Han et al. ............. 370/252 |
| 2012/0093009 | A1* | 4/2012 | Wang et al. ............ 370/252 |
| 2012/0134351 | A1* | 5/2012 | Ewert et al. ........... 370/338 |
| 2013/0044613 | A1* | 2/2013 | Edara et al. ........... 370/252 |
| 2013/0260687 | A1* | 10/2013 | Paycher et al. ......... 455/41.2 |
| 2014/0128113 | A1* | 5/2014 | Zisimopoulos et al. ...... 455/466 |

FOREIGN PATENT DOCUMENTS

| | | |
|---|---|---|
| JP | 2010028680 | 2/2010 |
| JP | 2013240053 | 11/2013 |

OTHER PUBLICATIONS

"ThirdPartyPlugins-Pidgin-Trac." http://developer.pidgin.im/wiki/ThirdPartyPlugins. Last accessed. Feb. 2, 2009 (3 pgs).

"C Plugin-How-To." http://developer.pidgin.im/wiki/CHowTo. Last accessed Feb. 2, 2009. (1 pg).

Extended European Search Report dated Apr. 22, 2014 in European Application No. 13167465.7 filed May 13, 2013.

Office Action dated Apr. 8, 2014 in Japanese Application No. 2013-100922 filed May 13, 2013.

GSM Association, "Ims Profile for Voice and SMS", Official Document IR. 92, Dec. 28, 2011, Version 5.0.

* cited by examiner

ADVANCED REAL-TIME IP COMMUNICATION IN A MOBILE TERMINAL

CROSS REFERENCE TO RELATED APPLICATIONS

This application claims the benefit of U.S. Provisional Application No. 61/645,635, filed May 11, 2012, and incorporated herein by reference for all intents and purposes.

BACKGROUND OF THE INVENTION

1. Field of the Invention

This invention relates to a framework and architecture for integrating Rich Communications Services (RCS) functionalities into client devices, such as, inter alia, smart phones and tablet computers, leveraging the standards RCS, IR.92, IR.94, and Internet Protocol Multimedia Subsystem (IMS).

RCS is a Global System for Mobile Communications (GSM) Association (GSMA) initiative to define mobile applications and services providing interoperable, convergent, rich communication experiences, including voice, video, messaging, presence, capabilities, content sharing, and other forms of communication, while supporting legacy functionality such as voice and Short Message Service (SMS).

IP Multimedia Subsystem or IMS is a standardized Next Generation Networking (NGN) architecture for telecom operators that want to provide mobile and fixed multimedia services. It uses Voice-over-IP (VoIP) implementation based on a 3rd Generation Partnership Project (3GPP) standardized implementation of Session Initiation Protocol (SIP), and runs over the standard Internet Protocol (IP). Existing phone systems, both packet and switched, are supported.

The GSM Association (GSMA) has defined the industrial standard, IR.92, "IMS Profile for Voice and SMS", and IR.94 to add video, both of which are incorporated herein by reference and apply to this disclosure.

2. Description of the Prior Art

The core of a typical mobile terminal (phone, device) includes a modem (Long Term Evolution (LTE), Third Generation (3G), or a combination of both LTE and 3G and an application processor. A 3G modem includes Global System for Mobile Communications (GSM) modem or Code Division Multiple Access (CDMA) modem. User control of the mobile terminal is provided by software running on the application processor. Control of the modem by the software on the application processor is traditionally carried out through the "AT" command strings. For example, to dial the phone number: 1-805-555-1212, an application sends the modem the string; "ATD 18055551212;", which instructs the modem to initiate a circuit switched call (Global System for Mobile Communications (GSM) or Code Division Multiple Access (CDMA)).

Please refer to FIG. 1, which illustrates typical software architecture on the application processor 110 inside a mobile terminal 100. The software architecture executed by the application processor 110 may include a Phone Dialer 120 (also referred to as Dialer application 120), a Short Message Service (SMS) Application 115, a Telephony Manager 130, an SMS Manager 125, a Radio Interface Layer (RIL) 101, and a Modem Driver 104 to operate the Modem 160.

As an example, when the user initiates a call or sends an SMS via the Phone Dialer 120 or SMS application 115 program, the Telephony Manager 130 issues a command to the Radio Interface Layer 101. The Radio Interface Layer 101 turns the command into an AT command. The RIL 101 may pass that message directly to the modem driver 104, or it may process the string and provide a different message to the modem driver 104, which will affect the required modem 160 functions.

SUMMARY OF THE INVENTION

A method of making Voice over Internet Protocol (VoIP) calls, legacy circuit calls, and sending/receiving Short Message Service (SMS) over Long Term Evolution (LTE) modem or a legacy modem, switching between the LTE and the legacy modem on a mobile terminal with both kinds of modems, and providing all legacy modem functions using existing applications on the mobile terminal is disclosed. A Session Initiation Protocol module (SIP) and Control/Status Module (CSM) subsystem make VoIP calls and send/receive SMS over Internet Protocol (SMSoIP) using the LTE modem. A Command Handler module directs voice and SMS messages from a modem driver to the SIP/CSM, and passes all other messages to the legacy modem directly. Based on radio policy set by a network or the mobile terminal, the CSM module determines whether the call or SMS will be processed by the SIP module and a Voice Engine as required or be passed to the legacy modem. The Command Handler module directs voice and SMS messages from the legacy modem to the SIP/CSM, and all other messages are passed through to the modem driver.

A method for dynamic selection of radio in a mobile terminal capable of Rich Communications Services (RCS), Long Term Evolution (LTE), legacy modem, and an alternate network interface is also disclosed. A Radio Policy Manager (RPM) on a LTE processor of the mobile terminal selects what radio or network to use for each communication function. The RPM is accessible to a network operator or the mobile terminal to set parameters or rules for making the determination.

A method for Session Initiation Protocol module (SIP) stack functions on a mobile terminal to be directed to different network interfaces using a single authenticated SIP connection is disclosed. A vPort Redirector (VPR) module, between the SIP stack and a Long Term Evolution (LTE)-network interface or any other alternate network interface, provides a virtual network interface, which redirects all SIP packets according to a radio policy selected either by the mobile terminal or an operator of the corresponding radio network.

A method of redirecting real-time Internet Protocol (IP) communication IP packet traffic on a mobile terminal, which normally goes thru a Voice-over-Long-Term Evolution (VoLTE) enabled LTE processor to an alternate network interface without duplicating another Session Initiation Protocol module (SIP) stack and related software outside of the LTE processor is disclosed. A vPort Redirector (VPR) module is inserted between the SIP stack and the VoLTE enabled LTE processor which redirects all IP packets that are normally transmitted over the LTE modem to an alternate network interface Daemon using an inter-processor communication mechanism. The alternate network interface Daemon interfaces with a sub-system to maintain a network connection established by the alternate network interface Daemon, and transmits/receives the IP packet traffic over the network connection established by the alternate network interface Daemon. All the SIP packet traffic goes through an authenticated SIP connection substantially the same as that used for VoLTE transmission.

A method of redirecting video packets that are produced and/or consumed by an application processor that performs video codec functions to a Long Term Evolution (LTE) LTE processor of a mobile terminal when video packets are to be transported over the LTE modem is disclosed. A video engine running on the application processor sends and receives video packets to/from the LTE modem. A vPort Redirector (VPR) module on the LTE processor requests access to a LTE video bearer channel. The video packets are exchanged between the video engine and the VPR using an inter-processor communication (IPC) mechanism.

A method of synchronizing video data on an application processor of a mobile terminal with voice data on a Long Term Evolution (LTE) processor enabled for Voice-over-Internet-Protocol (VoIP) or Voice over Long Term Evolution (VoLTE) is disclosed. Synchronization information is exchanged between a voice engine of the LTE processor and a video engine of the application processor using an inter-processor communication (IPC) mechanism between the video engine and the voice engine, allowing the video engine and voice engine to manage their respective decode rates so that voice and video are synchronized.

A method of distributing Session Initiation Protocol (SIP) functions across different processors while maintaining a single authenticated SIP connection for a mobile terminal is disclosed. A vPort Redirector module (VPR) is provided on a LTE processor of the mobile terminal. A SIP module on the LTE processor requests the VPR module to open a SIP connection to an Internet Protocol Multimedia Subsystem (IMS) core. The SIP module registers to the IMS core using the VPR module connection. The VPR module allows other SIP modules in the mobile terminal to use the VPR module connection to the IMS core.

A method for implementing Rich Communications Services (RCS) functions on a mobile terminal with a Long Term Evolution (LTE) processor using an Internet Protocol (IP) connection established by a Session Initiation Protocol (SIP) module in the LTE processor is disclosed. A protocol accelerator is implemented on an application processor of the mobile terminal providing SIP functions. A Control/Status Module (CSM) determines which SIP function is to be performed by the SIP module in the LTE processor and which SIP function is to implemented on the protocol accelerator, and routes RCS data via a vPort Redirector module in the LTE processor to the protocol accelerator or to the SIP module in the LTE processor according to the determination. All SIP data is transmitted over a single authenticated connection established by the SIP module in the LTE processor for Voice-over-Internet-Protocol (VoIP) and Short Message Service (SMS).

A method of avoiding dual registration problems when Rich Communication Services (RCS) functions on a mobile terminal having a Long Term Evolution (LTE) processor require Session Initiation Protocol (SIP) protocol functions to be performed outside of a SIP stack embedded in the LTE processor is disclosed. The SIP stack in the LTE processor registers with a network and establishes an authenticated SIP connection to an Internet Protocol Multimedia Subsystem (IMS) core for Voice-over-Internet-Protocol (VoIP) and Short Message Service over Internet Protocol (SMSoIP). All Internet Protocol (IP) packets for subsequent RCS functions that require SIP functions that operate outside of the LTE processor, and are destined for transmission through the LTE modem, are routed through a vPort Redirector (VPR) of the LTE processor which maintains a single authenticated SIP connection to the IMS core. Incoming packets from the IMS core, received via the LTE modem over the authenticated SIP connection, are routed through the VPR to the SIP stack embedded in the LTE processor or to a protocol accelerator in an application processor of the mobile terminal as required.

These and other objectives of the present invention will no doubt become obvious to those of ordinary skill in the art after reading the following detailed description of the preferred embodiment that is illustrated in the various figures and drawings.

DETAILED DESCRIPTION

Within this document and claims, the term "legacy modem" is defined as technologies such as, inter alia, Second Generation (2G) technologies, Third Generation (3G) technologies, Global System for Mobile Communications (GSM) technologies, Code division Multiple Access (CDMA) technologies, and Wideband Code Division Multiple Access (W-CDMA) technologies. The terms "Long-Term Evolution modem" and/or "LTE modem" are defined as a modem configured to be capable of Long-Term Evolution (LTE) transmission and/or reception technologies. The terms "Long-Term Evolution processor" and/or "LTE processor" are defined as a computation unit that can be configured as an LTE modem and may further be configured to include Voice-over-Long-Term Evolution (VoLTE) software, and may further be configured to include all versions of legacy modem technologies such as, inter alia, Second Generation (2G) technologies, Third Generation (3G) technologies, Global System for Mobile Communications (GSM) technologies, Code division Multiple Access (CDMA) technologies, and Wideband Code Division Multiple Access (W-CDMA) technologies and may be embedded within the LTE processor. Furthermore, the term "Network Interface" is defined as a point of interconnection between the mobile terminal and a private or public network. Furthermore, the term "Alternate Network Interface" is defined as a Network Interface capable of all versions of transmission and/or reception technologies such as, inter alia, Wi-Fi™ technologies, DPRS (DECT Packet Radio Services) and Ethernet technologies, and run on the application processor. Furthermore, the term "Alternate Network Interface Daemon" is a process that runs on the application processor used to manage connection to Alternate Network Interfaces. Throughout this document and claims, particular technologies are presented as specific examples of use; however, in all cases the description of a particular technology does not limit the claims to only that technology, but is intended to be generalized as described above. For example, a discussion of a Wi-Fi™ Daemon should be considered a discussion of any and/or all versions of an Alternate Network Interface Daemon as defined above, and a discussion of 3G modem technologies should be considered a discussion of any and/or all versions of a legacy modem also as defined above.

Figure 2:
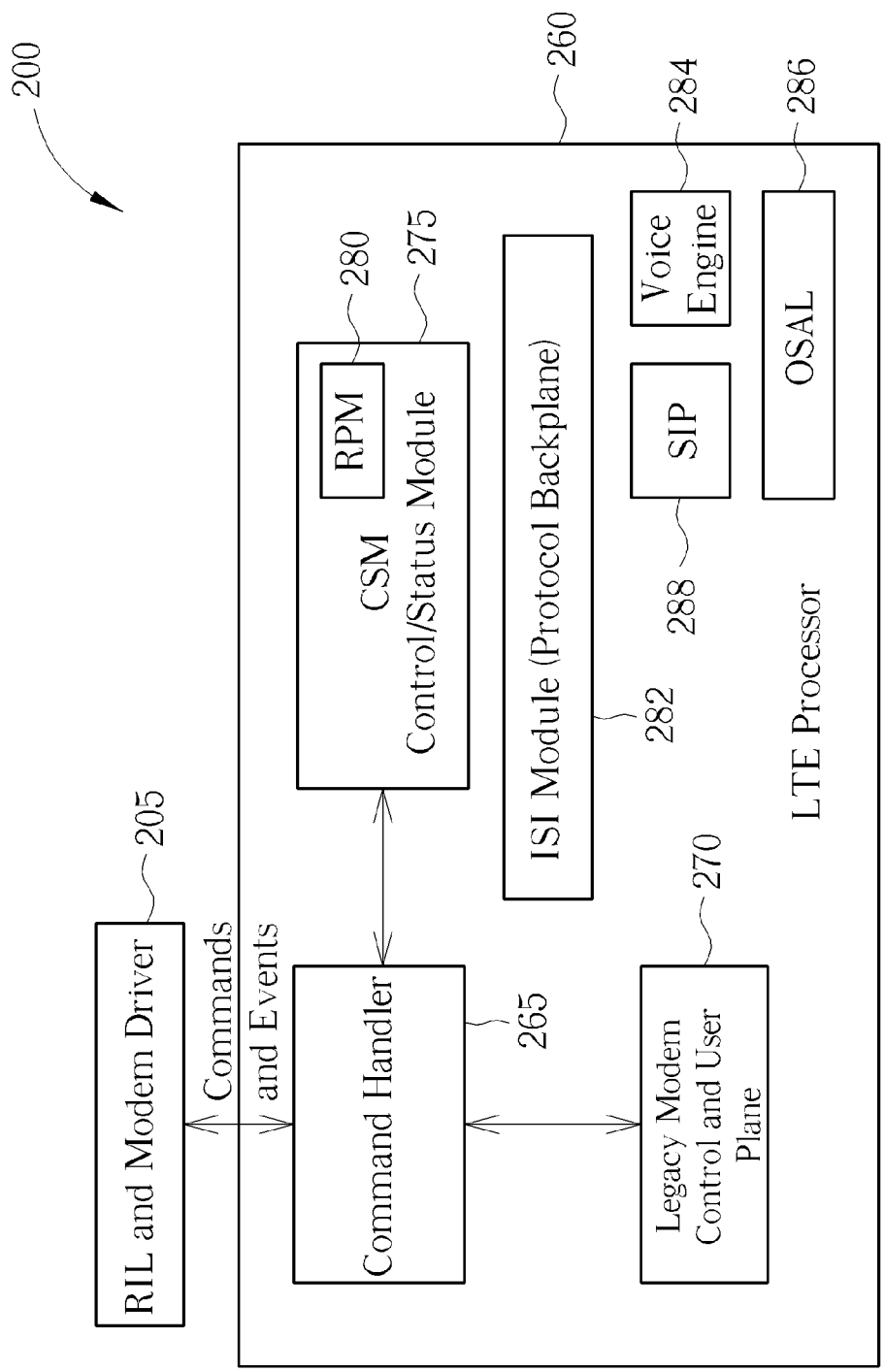
FIG. 2 is a functional block diagram showing the addition of VoIP to the LTE processor.

This document describes a complete software system for adding Short Message Service (SMS) and Voice over Long Term Evolution (VoLTE), video, Rich Communication Suite (RCS) support, and Wi-Fi™ offload to a mobile terminal. It starts by with adding VoLTE functions to an LTE processor. The final section (FIG. 6) describes a full featured system that includes voice and video calling, SMS over Internet Protocol (SMSoIP), RCS features (inter alia, instant messaging (IM), file transfer and content share) and Wi-Fi™ offload. Because of the modular approach disclosed herein, it is relatively easy to provide subsets of this fully featured system using the same design and software blocks. For example, FIG. 2 is a product for just VoLTE, SMSoIP, and Single Radio Voice Call Continuity (SRVCC), whereas FIG. 3 adds Wi-Fi™ offload, and FIG. 4 adds Video call, etc.

Adding VoIP (VoLTE) to the Legacy Architecture

There have been different approaches to adding VoIP applications to mobile terminals. One approach is to create a completely separate application, alongside the current Android telephony stack (see Telephony Manager 130 and SMS Manager 125, RIL 101 in FIG. 1.) Another approach is to make changes to the telephony stack to allow the existing Telephony Manager 130 to determine whether the call is to be a VoIP call (or a legacy circuit call), and send instructions to a VoIP protocol stack (or legacy voice stack) to process the call.

Figure 1:
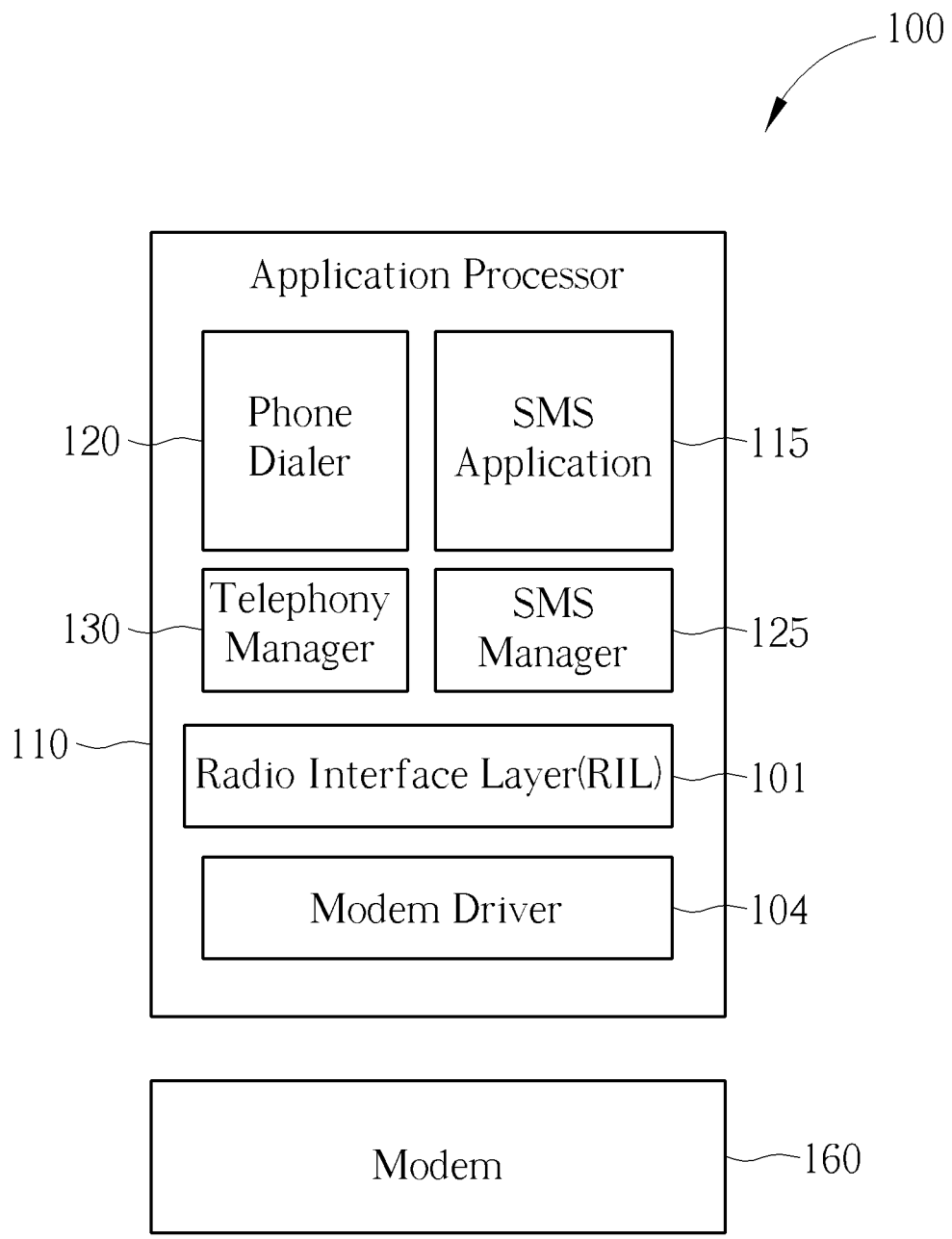
FIG. 1 illustrates traditional mobile phone software architecture.

Since all voice calls over an LTE modem are conducted using VoIP, it is highly desirable for the LTE processor to present the same RIL to the phone and SMS application, so that the same commands for legacy voice call and SMS can be accepted and handled, as illustrated in FIG. 1.

Thus a technique to enable making VoIP calls, legacy circuit calls and send/receive SMS over LTE modem or legacy modem (2G, 3G), and to switch between them (as required by IR.92 specification) on a mobile terminal with both LTE and legacy modem, and provide all legacy modem functions (such as SIM registration, SIM address etc.) using existing applications on the mobile terminal for voice and SMS, and retains all legacy modem functions is disclosed. In addition to adding a subsystem of SIP stack and control software for making VoIP calls and sending/receiving SMS provided by the SIP software on the LTE processor, a software module Command Handler directs voice and SMS messages from the modem driver to the SIP/CSM subsystem, and passes all other messages to the legacy modem directly. The CSM module will determine, based on the radio policy set by the network or the mobile terminal, whether the call or SMS will be processed by the SIP stack and Voice Engine (if required) or be passed through to the legacy modem. The Command Handler module also directs voice and SMS messages from the legacy modem to a SIP/CSM subsystem, and all other messages are passed through to the modem driver Allowing radio policy for voice, SMS and other communications functions such as IM, video call, etc. (generally known as RCS functions) to be selected on a per functions basis either by the mobile terminal, or the mobile network operator is disclosed. A software module is accessible to either the network or mobile terminal to set parameters or rules which determine which network interface to use for a voice call or SMS message or other RCS functions.

Also a technique for a mobile terminal that has a multitude of communication functions, (including voice, SMS, IM, video call, file sharing, content sharing, location, address book sync etc. generally known as RCS) to selectively conduct each of these functions on a network interface of choice (such as LTE, 3G, Wi-Fi™ etc.), and for the selection of the network interface to be dynamically controlled by either the mobile network operator, or the mobile terminal to make this selection is disclosed. A module of software to provide network interface selection and which will be examined by ALL communication applications running on the mobile terminal to determine which network interface (e.g. LTE, 3G, Wi-Fi™) to use for each communication function (such as voice, or IM, or video, etc), and is accessible to the mobile network operator or mobile terminal to modify the selection of radio for different communication functions can be used.

In order for the LTE processor to provide a RIL 101 (for VoLTE functionality) to the telephone and SMS application 115, additional VoLTE blocks are added below RIL 205 in the mobile terminal 200 as shown in FIG. 2. The LTE processor 260 of the mobile terminal 200 comprises a Legacy Modem Control and User Plane module 270 (also referred to as legacy modem 270), and the added VoLTE blocks including a Command Handler 265, an Internet Service Interface (ISI) module 282, a Voice Engine 284, a Session Initiation Protocol (SIP) module 288, an Operating System Abstraction Layer (OSAL) 286, and a Control/Status Module (CSM) 275. The CSM 275 includes a Radio Policy Manager (RPM) module 280. The command from the RIL (shown in FIG. 2 as 205) to the added VoLTE blocks 265, 282, 284, 288, 286, 270 and 275 may be standard AT commands or a proprietary interface specified by the modem chip vendor.

With the architecture shown in FIG. 2, for LTE processors that contain an LTE and legacy modem, commands and events are the same regardless of whether the call is placed over the IP network or legacy circuit network. The additional software components in this architecture are:

The Command Handler 265—this module is responsible for routing commands and events. All voice call and SMS commands from the RIL (via the modem driver) 205 are routed to the CSM module 275. The remaining commands are passed through to the legacy modem module 270. All non-voice call, non-SMS events from the modem driver 205 are passed directly to the Command Handler 265 and then to the legacy modem 270. Voice and SMS events are intercepted by the Command Handler 265 and passed to the CSM 275.

The Command/Status Module (CSM) 275 is responsible for managing all voice calls and SMS sessions.

The ISI Module 282 provides a protocol independent interface for the CSM module 275 to communicate with the legacy modem 270, SIP 288, and Voice Engine 284 modules.

The SIP 288 module performs all the necessary SIP operations to manage calls and SMS messaging.

The Voice Engine 284 is controlled by the CSM module 275 using ISI 282 commands. The Voice Engine 284 performs all voice processing functions, including processing voice samples, coding/decoding, acoustic echo cancellation (AEC), jitter buffer, and packet loss compensation (PLC). The Voice Engine 284 also produces Real-Time Transport (RTP) packets to be sent over the network, and processes RTP voice packets received from the network.

OS Abstraction Layer (OSAL) module 286: The OSAL module 286 is used to abstract operating system specific operations to facilitate porting components to different operating systems (e.g. LINUX, RTOS etc.) Examples include opening and closing network sockets.

Radio Policy Manager (RPM) module 280: In order to support the IR-92 (VoLTE) specification, which allows audio calls to be switched between VoIP and legacy technologies, the CSM module 275 has an RPM 280 sub-module, which is designed to intelligently make decisions on what network interface to use for each call or SMS message. For deployments where the network interface selection decision is made by the mobile network operator, the RPM module 280 will follow the radio policy set by the mobile network operator and information from the LTE modem control plane.

Use Case: Accept Incoming VoIP Call

After the mobile terminal 200 has registered with the service provider, it is available to receive voice calls. Once a call is initiated or received, the RIL module 205 polls the modem driver at fixed intervals for all call status from the network. The SIP module 288 listens for new commands from the network via the OSAL module 286.

Listed below is the sequence of actions that occur for an incoming VoIP call.

1. When there is an incoming call, the OSAL module 286 receives an invitation to a new VoIP session.
2. The SIP module 288 receives this request and sends a message to the CSM module 275 via the ISI module 282.
3. The CSM module 275 creates an event to the Command Handler 265 for the request of a new call, which is passed up to the Dialer application 120 via the modem driver (and RIL) 205.
4. CSM module 275 commands the SIP module 288 to acknowledge receipt of the request to the network.
5. The network sends an acknowledgement that the message was received.
6. While the call is waiting to be answered, the RIL module 205 continues to poll the modem driver 205 at fixed intervals for status of the incoming call.
7. The modem driver 205 sends the command to the Command Handler 265 which passes the command to the CSM module 275.
8. The CSM module 275 replies with the current state of the call.
9. When the user answers the call, the Dialer application 120 sends a command to the modem driver 205 to answer the call.
10. The modem driver 205 passes the command to the Command Handler 265 which passes the command to the CSM module 275.
11. The CSM module 275 commands the SIP module 288 to accept the call.
12. The SIP module 288 tells the network that the call has been answered.
13. The network responds with an acknowledgement that the call has been accepted.
14. The CSM module 275 commands the Voice Engine 284 to begin streaming audio between the audio interfaces and an RTP connection on the IP interface through the OSAL module 286 to the calling party.
15. The call is now active (connected).
16. The CSM module 275 continues to report the status to the modem driver 205 at the next RIL 206 polling interval.

Use Case: Outgoing VoIP Call

After the mobile terminal 200 has registered with the service provider, it is available to initiate voice calls. Listed below is the sequence of actions that occur for an outgoing VoIP call.

1. The user initiates a call in the Dialer application 120. The modem driver 205 receives a command to initiate a call.
2. The modem driver 205 passes the command to the Command Handler 265 which passes the command to the CSM module 275.
3. The CSM module 275 queries the RPM module 280 to determine the proper network interface to use. In this case LTE VoIP is selected.
4. The CSM module 275 tells the SIP module 288 to initiate the call.
5. The network responds with a "trying" message, which is passed to the SIP module 288 via the OSAL module 286.
6. The SIP module 288 notifies the CSM module 275 of the new message. The CSM module 275 responds by sending a message to the Command Handler 265 that it received the "trying" message.
7. The Command Handler 265 passes the message to the modem driver 205.
8. The network sends an "acknowledgement", message, which is passed to the SIP module 288 via the OSAL module 286.
9. The SIP module 288 passes the information to the CSM module 275.
10. At fixed polling intervals, the modem driver 205 receives the command from the RIL 205 for the state of all calls.
11. The modem driver 205 sends the command to the Command Handler 265 which passes the command to the CSM module 275.
12. The CSM module 275 replies with the current state of the call.
13. When the remote party answers, the SIP module 288 receives a message from the network (via the OSAL module 286) that the remote party has "Accepted" (answered).
14. The SIP module 288 sends the message to the CSM module 275.
15. The CSM module 275 commands the Voice Engine 284 to begin streaming audio between the audio interfaces and an RTP connection on the IP interface through the OSAL module 286 to the called party.
16. At the next polling interval, a new request for call state is passed from the modem driver 205 to the Command Handler 265 to the CSM module 275.
17. This time the CSM module 275 reports that the call has been answered. This message is passed to the Command Handler 265 and on to the modem driver 205.
18. The call is now active (connected.)

Use Case: Incoming CS Call

When a legacy circuit switched (CS) network is available, the service provider may route incoming calls via the legacy CS network. Listed below is a sequence of actions that occur in response to an incoming CS call.

1. A remote user calls the mobile terminal 200 via the legacy CS network.
2. The legacy modem 270 receives a command from the network.
3. The legacy modem 270 generates an asynchronous event that an incoming call is requested.
4. The Command Handler 265 passes this event to the CSM module 275. The CSM module 275 is initialized to handle the call.
5. The CSM module 275 generates an event to the Command Handler 265 which passes this event to the modem driver 205, and up to the Dialer application 120.
6. The modem driver 205 receives commands asking for the current state of the call at fixed intervals.
7. The commands in event 6 are passed to the CSM module 275 using the Command Handler 265.
8. When the user answers the call, the modem driver 205 receives a command to answer the call. This command is passed to the CSM module 275 via the Command Handler 265.
9. Since the CSM module 275 knows that this is a legacy circuit switched (CS) call, the CSM module 275 sends the command to the legacy modem module 270 (and subsequently the network) via the Command Handler 265.
10. The legacy modem module 270 responds with an event of "call accepted".

11. The CSM module 275 receives this event from the legacy modem module 270 through the Command Handler 265.
12. The CSM module 275 passes the "call accepted" event to the modem driver 205 using the Command Handler 265.
13. The call is now active.
14. The next time the modem driver 205 is polled about the state of the call, it will receive a report from the CSM module 275 that the call is active.

Use Case: Outgoing CS Call

When a legacy CS network is used, the outgoing call is routed to the legacy modem module 270. Listed below is a sequence of actions for making an outgoing CS call.
1. When the user initiates a call, the modem driver 205 receives a command to initiate a call.
2. The modem driver 205 passes the command to the Command Handler 265 which passes the command to the CSM module 275.
3. The CSM module 275 queries the RPM module 280 to determine the proper interface to use. In this case the legacy modem interface is selected.
4. The CSM module 275 tells the legacy modem module 270 to start a call.
5. At fixed polling intervals, the modem driver 205 receives a RIL 205 command requesting the state of all calls.
6. The modem driver 205 sends the command to the Command Handler 265 which passes the command to the CSM module 275.
7. The CSM module 275 queries the legacy modem module 270 as to the current state of the call by sending a command to the legacy modem module 270 through the Command Handler 265.
8. The legacy modem module 270 replies with the current state of the call, and this information is sent to the CSM module 275 via the Command Handler 265.
9. The CSM module 275 replies to the modem driver 205 with the current state of the call via the Command Handler 265.
10. After a number of polling intervals, the remote party answers.
11. At the next polling interval, a new request for call state is passed from the modem driver 205 to the Command Handler 265 and then to the CSM module 275.
12. The CSM module 275 queries the legacy modem module 270 as to the current state of the call by sending a command via the Command Handler 265.
13. The legacy modem module 270 replies with the current state of the call, which has changed to "active." This status is sent to the CSM module 275 via the Command Handler 265.
14. The CSM module 275 replies to the modem driver (RIL poll) 205 with the current state of the call (viz. "active") via the Command Handler 265.
15. The call is now active.

Use Case: USSD Support

GSM service providers utilize a protocol called Unstructured Supplementary Service Data (USSD) to provide some simple non-voice services. LTE modems provide similar services.

Listed below is the sequence of actions that support USSD via GSM.
1. The user initiates a request for a USSD service (via an application on the mobile terminal 200.) This is done by dialing a special code.
2. The modem driver 205 receives this dial out request and passes it to the Command Handler 265, which in turn passes it to the CSM module 275.
3. The CSM module 275 handles this sequence like an outgoing CS call. The CSM module 275 queries the RPM module 280 to determine the proper network interface to use. In this case GSM is selected.
4. The CSM module 275 passes the dial command to the legacy modem module 270 via the Command Handler 265.
5. The legacy modem Module 270 provides a response which is passed to the CSM module 275 (via the Command Handler 265), and forwards the code to the network.
6. The CSM module 275 passes the response back to the modem driver 205 via the Command Handler 265.
7. After the service provider has processed the code, an unsolicited response will be sent to the legacy modem module 270 via the network.
8. The legacy modem module 270 will pass the response to the Command Handler 265 which in turn passes it up to the modem driver 205.

Requesting USSD services via the LTE modem (network) follows a similar sequence.

Adding Wi-Fi™ Offload

Figure 3:
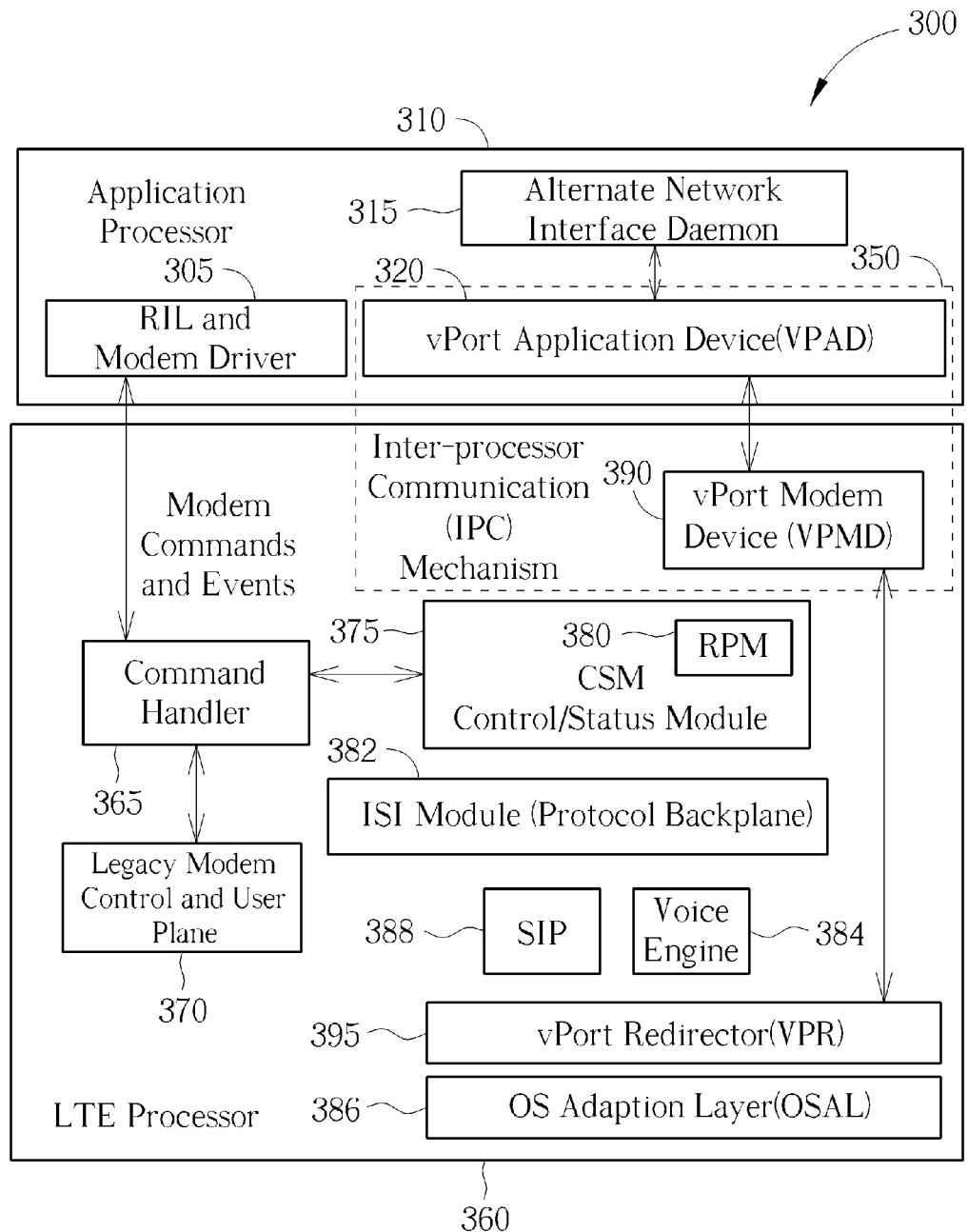
FIG. 3 is a functional block diagram showing the addition of Wi-Fi Offload.

One of the features that some mobile network operators (MNO) require is that VoIP and SMSoIP be off-loaded via Wi-Fi™. This reduces wireless network traffic on the LTE network. A preferred approach to providing this feature to the mobile terminal is to add a message redirector and other software modules to the LTE processor as shown in FIG. 3. Throughout this disclosure, the trademark Wi-Fi™ is intended to mean a wireless radio system certified as Wi-Fi™ compliant by the Wi-Fi Alliance rather than to mean the source of the technology or certification.

Thus a technique for redirecting real time IP communication (such as VoIP or SMSoIP or Video over IP) IP packet traffic on a mobile terminal, which normally goes thru the LTE modem to the Wi-Fi™ radio without duplicating another SIP stack and related software outside of the LTE processor (on the application processor of the mobile terminal) is disclosed. A software module (or software function) is inserted between the SIP stack and the LTE modem, which redirects all IP packets that are normally transmitted over the LTE modem, to the Wi-Fi™ Daemon using an inter-processor communication (IPC) mechanism. The Wi-Fi™ Daemon will interface to the Wi-Fi™ sub-system to maintain connection to the Wi-Fi network and transmit said IP traffic over Wi-Fi™ radio network. Even though the IP packets are transmitted using Wi-Fi™, by using the embedded SIP stack in the LTE processor, all such SIP traffic will go through an authenticated SIP network connection similar to that for LTE transmission.

The LTE processor 360 of the mobile terminal 300 comprises a Legacy Modem Control and User Plane module 370, a Command Handler 365, an Internet Service Interface (ISI) module 382, a Voice Engine module 384, a Session Initiation Protocol (SIP) module 388, an Operating System Abstraction Layer (OSAL) 386, and a Control/Status Module (CSM) 375. The CSM 375 includes a Radio Policy Manager (RPM) 380. To allow VoIP and SMSoIP to be off-loaded via Wi-Fi™, the LTE processor 360 differs from the LTE processor 260 in that the LTE processor 360 further comprises a vPort Redirector (VPR) 395, and a vPort Modem Device (VPMD) 390. The mobile terminal 300 further includes the RIL and Modem Driver 305, and introduces an Alternate Network Interface Daemon 315 and a vPort Application Device (VPAD) 320 running on the application processor. The vPort Modem Device (VPMD) 390 and the vPort Application Device (VPAD) 320 may be functionally considered together as an Inter-processor Communication (IPC) mechanism 350.

The new LTE processor software modules 390, 395, 315, and 320 added to provide Wi-Fi™ offload shown in FIG. 3 are:

vPORT Redirector (VPR) 395 is a module that directs network packets to the proper network interface. Each SIP, RTP, and RTCP packet is presented to the VPR module 395. If it is intended for a network interface on the LTE processor 360, it is sent to the OSAL module 386. If it is intended for Wi-Fi™ (or other interfaces accessible to the application processor), it is sent to the VPMD module 390. The VPR 395 appears as a virtual network connection to the SIP module 388, so that said SIP module 388 does not need to be aware of which radio interface is being used.

vPORT modem device (VPMD) 390. This module provides communication services between the VPR module 395 (on the LTE processor) and the VPAD module 320 on the application processor 310.

The new modules on the application processor 310 are:

The vPORT Application Device driver (VPAD) 320 communicates with the VPMD module 390 on the LTE processor 360.

Wi-Fi™ Daemon 315: When a packet is received from the Wi-Fi™ interface, the Wi-Fi™ Daemon writes the data to the VPAD module 320. The VPAD module 320 passes the data to the VPMD module 390. The VPMD module 390 passes the data to the VPR module 395, which then passes the data to either the SIP module 388 or the Voice Engine 384 depending on the type of data received. Similarly, the Wi-Fi™ Daemon waits for data from the VPAD module 320. Any new SIP or RTP messages from the VPAD module 320 will be sent over Wi-Fi™ as soon as they arrive at the Wi-Fi™ Daemon 315.

How the Wi-Fi™ Daemon Works

The Wi-Fi™ Daemon manages W-Fi™ network connection on behalf of the modules running on the LTE processor 360. When the SIP module 388 needs to use a Wi-Fi™ interface, the SIP module 388 requests a Wi-Fi™ connection from the VPR module 395. The VPR module 395 contacts the Wi-Fi™ Daemon 315 (via the VPMD 390 and VPAD 320 IPC mechanism) to open a network connection. The SIP module 388 uses the VPR module 395 connection to register with the IP Multimedia Subsystem (IMS) core. After the registration is completed successfully, the SIP module 388 can use the Wi-Fi™ interface to initiate or receive VoIP calls and SMSoIP messages. When the Voice Engine 384 needs to use the Wi-Fi™ interface (e.g. for RTP or RTCP packets), the Voice Engine 384 requests a Wi-Fi™ connection from the VPR module 395.

Use Case: Outgoing Wi-Fi Call

Prior to initiating a Wi-Fi™ call, the Wi-Fi™ radio must become the radio used for voice calling. The CSM module 375 is told to register with the Wi-Fi™ radio by an RPM event. After the event, the CSM module 375 registers with the service provider over Wi-Fi™.

In this example, the RPM event is triggered when a Wi-Fi™ access point is available, and there are no active calls. After the mobile terminal 300 is registered with the service provider, it is available to initiate voice calls over Wi-Fi™. Listed below is the sequence of actions for an outgoing VoIP call.

1. When the user initiates a call, the modem driver 305 receives a command to initiate a call.
2. The modem driver 305 passes the command to the Command Handler 365 which passes the command to the CSM module 375.
3. The CSM module 375 queries the RPM module 380 to determine the proper network interface to use. In this case Wi-Fi™ VoIP is selected.
4. The CSM module 375 tells the SIP module 388 (via ISI module 382) to initiate the call over Wi-Fi™.
5. The SIP module 388 creates a SIP session and passes the packets to the VPR module 395.
6. Since the VPR module 395 has been told that the SIP session is over Wi-Fi™, the VPR module 395 passes the packets to the VPMD module 390.
7. The VPMD module 390 passes the packets up to the VPAD module 320.
8. The Wi-Fi™ Daemon 315 listens to the VPAD module 320 for activity. When a new packet is available, it is sent out via a Wi-Fi™ socket.
9. The network responds with a "trying message." This message is passed back down to the SIP module 388 via the Wi-Fi™ Daemon 315/VPAD 320/VPMD 390/VPR 395 path.
10. The SIP module 388 notifies the CSM module 375 of the new message. The CSM module 375 responds by sending a message to the Command Handler 365 that it has received the "trying" message.
11. The Command Handler 365 passes the message to the modem driver 305.
12. The network sends an acknowledgement. This message is passed to the SIP module 388 via the Wi-Fi™ Daemon 315/VPAD 320/VPMD 390/VPR 395 path.
13. The SIP module 388 passes the information to the CSM module 375.
14. At fixed polling intervals, the modem driver 305 receives a RIL 305 command that requests the state of all calls.
15. The modem driver 305 sends the request to the Command Handler 365 which passes the command to the CSM module 375.
16. The CSM module 375 replies with the current state of the call.
17. When the remote party answers the call, the SIP module 388 receives a message from the network (from the Wi-Fi™ Daemon 315 via the VPR module 395) that the remote party answered.
18. The SIP module 388 sends the new status to the CSM module 375.
19. The CSM module 375 commands the Voice Engine 384 to begin streaming audio between the audio interfaces and an RTP connection on the Wi-Fi™ interface via the VPR 395/VPMD 390/VPAD 320/Wi-Fi™ Daemon 315 path.
20. At the next polling interval, in response a new request for call state from the modem driver 305 (via the Command Handler 365) the CSM module 375 reports that call has been answered.
21. This "call has been answered" message is passed to the Command Handler 365 and then to the modem driver 305.
22. The call is now active.

One skilled in the art can readily understand that the above description of offloading an outgoing call onto Wi-Fi™ could be easily altered to offloading an outgoing call onto another form of an Alternate Network Interface by replacing the Wi-Fi™ Daemon with the other form of Alternate Network Interface Daemon, and including any necessary hardware changes.

Use Case: Incoming Wi-Fi™ Call

Prior to receiving a Wi-Fi™ call, the device must be registered with the service provider over the Wi-Fi™ radio. The previous use case provides a scenario of how that may occur. Listed below is the sequence of actions for an incoming VoIP call assuming that the device is registered over Wi-Fi™

1. The Wi-Fi™ Daemon 315 listens to the appropriate network socket for messages.

2. The Wi-Fi™ Daemon 315 receives an invitation to a new VoIP session when a request for a call comes over Wi-Fi™.
3. The Wi-Fi™ Daemon 315 sends this invitation to the SIP module 388 via the VPAD 320/VPMD 390/VPR 395 path.
4. After the SIP module 388 receives this request, it sends a message to the CSM module 375 (via the ISI module 382.)
5. The CSM module 375 sends a request for a new call to the modem driver 305 via the Command Handler 365.
6. The CSM module 375 commands the SIP module 388 to acknowledge receipt of the request to the network. This request is routed by the VPR module 395 to the Wi-Fi™ Daemon 315.
7. The network sends an acknowledgement that the message was received. This message is received by the Wi-Fi™ Daemon 315 and routed to the SIP module 388 using the VPAD 320/VPMD 390/VPR 395 path.
8. At fixed polling intervals, the modem driver 305 receives a command that requests the state of all calls.
9. The modem driver 305 sends the command to the Command Handler 365 which passes the command to the CSM module 375.
10. The CSM module 375 replies with the current state of the call.
11. When the user answers the call, the Dialer application 120 sends a command to the modem driver 305 to answer the call.
12. The modem driver 305 passes the command to the Command Handler 365 which passes the command to the CSM module 375.
13. The CSM module 375 commands the SIP module 388 to accept the call.
14. The SIP module 388 tells the network that the call has been answered. This is done by sending a message to VPR module 395 which is routed to VPMD 390/VPAD 320 and finally to the network using the Wi-Fi™ Daemon 315.
15. The CSM module 375 commands the Voice Engine 384 to begin streaming audio between the audio interfaces and an RTP connection on the Wi-Fi™ interface via the VPR 395/VPMD 390/VPAD 320/Wi-Fi™ Daemon 315 path.
16. The network responds with an acknowledgement that the call has been accepted.
17. The call is now active.
18. The CSM module 375 reports the new status at the next polling interval.

One skilled in the art can readily understand that the above description of receiving a call over Wi-Fi™ could be easily altered to receiving a call over another form of an Alternate Network Interface by replacing the Wi-Fi™ Daemon with the other form of the Alternate Network Interface Daemon, and including any necessary hardware changes.

Adding Video Calling

To add video calling to the mobile terminal, a Video Engine must first be added. Hardware acceleration for video codec is typically provided as a hardware subsystem that is controlled by the application processor. Although video calling can also be implemented in software running on the application processor CPU, power savings and memory efficiencies demand using a separate hardware accelerator for video processing. Video codecs are not included in the LTE processor because of limited memory and CPU on the LTE processor hardware. Such processors are highly optimized for cost because they can be used in a variety of applications, such as dongles or low cost phones, which do not require video processing.

The first challenge in providing video calling capability is to come up with an approach for a video application (such as a video dialer) to initiate and manage a video call. Standard AT commands do not provide capabilities such as creating a video call, adding video to an active voice call, terminating the video portion of the call, and reporting status of the video call. The AT command set can be extended to provide these capabilities under the disclosed software architecture. However, this approach is not preferred because the industry is moving away from the AT Command set. Many modem chip providers are now proposing proprietary interfaces under the RIL. The approach taken in the disclosed design is to leverage the Wi-Fi™ offload architecture to provide a method for controlling, managing, and passing the necessary data for video calling.

The second challenge in adding video calling to the mobile terminal is to minimize the overhead and restrictions in adding the Voice Engine. This requires the Video Engine to be located and executed INSIDE the video application software. It allows the Video Engine to access the desired section of the screen without permission problems and additional overhead.

Thus a technique to redirect video packets that are produced and consumed by a processor that perform video codec functions to the LTE processor so that video packets can be transported over the LTE modem (to take advantage of the bearer channel supported by the modem) is disclosed. A typical LTE processor has limited CPU and memory hardware and cannot perform video codec functions, so video codec functions have to be implemented on an attached application processor. In order for the video packets to be transported over the LTE bearer channel via the LTE modem, the video engine that is running on the application processor sends and receives video packets to/from the LTE modem. Video data flow between the video engine (on the application processor) and the LTE processor is handled by an inter-processor communication (IPC) mechanism. A network packet redirector module on the LTE processor opens access to the bearer channel using LTE modem control functions, and data is exchanged between the Video Engine and video redirector module using the IPC mechanism. If there are other alternate network interface options, then a video packet redirector module on the application processor is needed to redirect the video data to said alternate network interface, such as Wi-Fi™, instead of the LTE modem. A control module in the LTE processor is responsible for selecting the network interface to be used by video data and control packets. By routing all video packets through the video packet redirector module, the proper network interface for video traffic can be controlled. Video packets that are to be transmitted over the Wi-Fi™ channel are redirected to the Wi-Fi™ Daemon by the video packet redirector module. This way to re-route packets is more efficient during a Wi-Fi™ call than directly exchanging packets between the voice engine and network packet redirector module (on the LTE processor) and then having the network packet redirector module route the video packets back to the Wi-Fi™ Daemon (on the application processor.)

A technique to synchronize video data on an application processor on a mobile terminal with the voice data on the LTE processor (which is enabled for VoIP or VoLTE) is also disclosed. In order for voice and video packets to be synchronized, information must be exchanged between the voice and video engines. The voice and video engines exchange information (for example the absolution time of the packet currently being heard or displayed) using an inter-processor communication (IPC) mechanism logically situated between the Video Engine and the Voice Engine. This approach allows the voice and video engines to manage their respective decode rates so that voice and video are synchronized.

Figure 4:
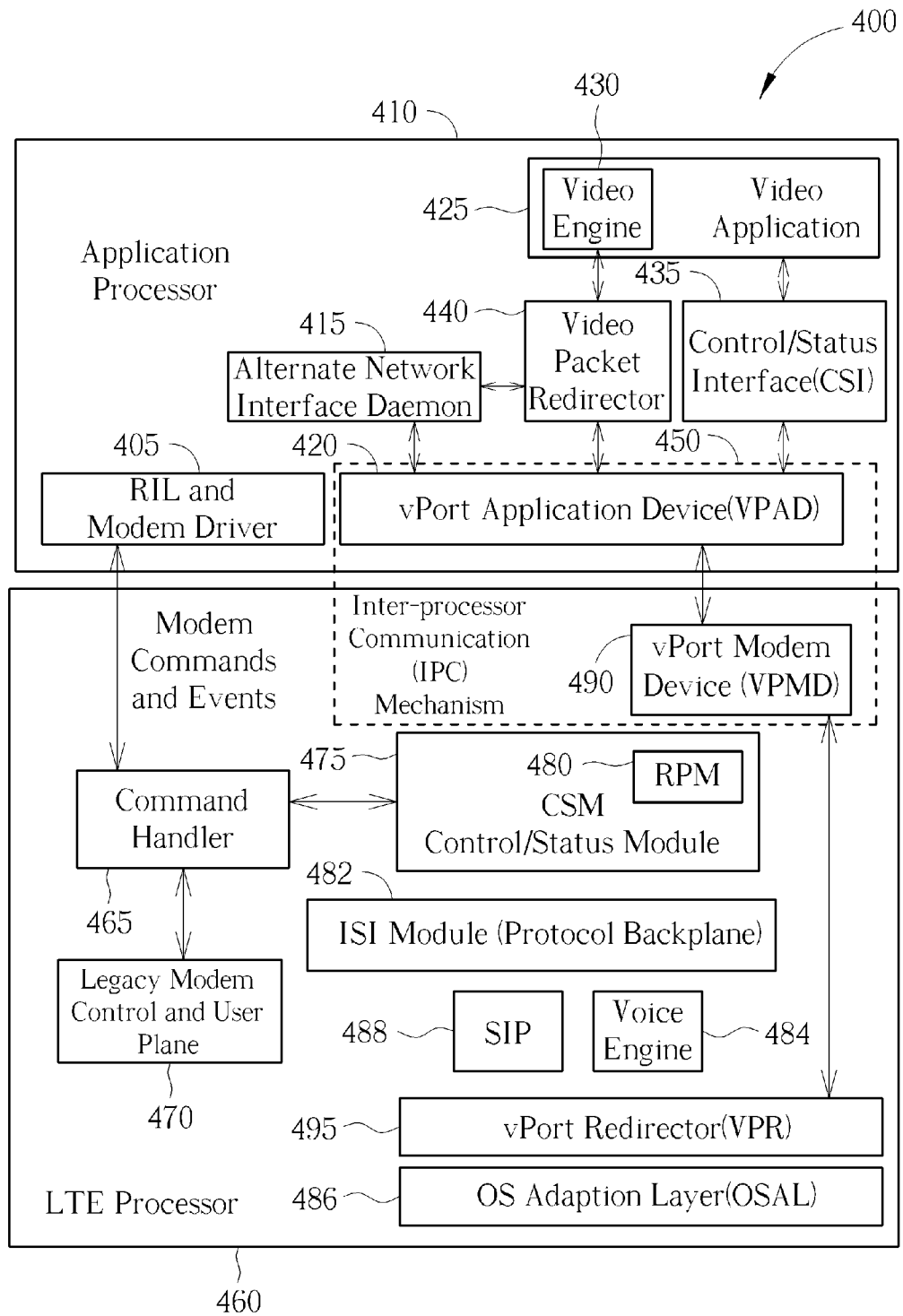
FIG. 4 is a functional block diagram showing the addition of video calling with Wi-Fi Offload.

Please refer to FIG. 4. The LTE processor 460 of the mobile terminal 400 comprises a Legacy Modem Control and User Plane module 470, a Command Handler 465, an Internet Service Interface (ISI) module 482, a Voice Engine module 484, a Session Initiation Protocol (SIP) module 488, an Operating System Abstraction Layer (OSAL) 486, a vPort Redirector (VPR) 495, a vPort Modem Device (VPMD) 490, and a Control/Status Module (CSM) 475. The CSM module 475 includes a Radio Policy Manager (RPM) 480.

To add video calling, the mobile terminal 400 differs from the mobile terminal 300 in that the application processor 410 of the mobile terminal 400 further comprises a Video Application 425 which includes a Video Engine 430, a Video Packet Redirector 440, and a Control/Status Interface (CSI) 435. The mobile terminal 400 further includes the RIL and Modem Driver 405, the Wi-Fi™ Daemon 415, and the vPort Application Device (VPAD) 420 run by the application processor 410. The vPort Modem Device (VPMD) 490 and the vPort Application Device (VPAD) 420 may be functionally considered together as an Inter-processor Communication (IPC) mechanism 450.

The new application processor 410 software modules 425, 430, and 440 added to add video calling support shown in FIG. 3 are:

The CSI module 435 provides the services needed by the video application 425 to create and control a video call.

The Video Engine 430 shares a process with the video application 425. The Video Engine 430 is responsible for encoding and decoding video streams. In addition, the Video Engine 430 contains a jitter buffer.

Both the CSI module 435 and the Video Engine 430 communicate with the VPMD module 490 via the VPAD module 420. This communication path allows the CSM module 475 to control the video call functions provided by the CSI module 435 and the Video Engine 430 so that video functions are coordinated with voice functions (controlled by the CSM module 475). In addition, this architecture allows video data to be exchanged with the LTE processor 460 so that it can be placed on the video bearer channel.

The Video Packet Redirector 440 allows video data to be either carried over the mobile network (or bearer channel), or placed over Wi-Fi™. It allows video data to be transported over Wi-Fi™ more efficiently, and also for video data to be transported over a different network from the audio data in the same video call.

Use Case: Standard Video Call over LTE

The main difference between a video call and a voice call is that the commands can no longer come from the modem driver unless it has been extended to support video calls. Below is a sequence of actions for establishing a video call.

1. The user initiates a video call (inside the Video Application 425)
2. The Video Application 425 interacts with the CSI module 435 to create the video call. In addition, it starts up the Video Engine 430.
3. The CSI module 435 sends a command to the CSM module 475 via the VPAD module 420 and the VPMD module 490 to start the call.
4. The CSM module 475 sends the necessary commands to the SIP module 488 (via ISI module 482) to establish a video call.
5. The CSM module 475 then reports progress to the CSI module 435 via the VPMD 490/VPAD 420 path.
6. When the call is answered, the CSM module 475 sends a status update (from the SIP module 488) to the CSI module 435. In addition, The CSM module 475 starts up the voice and video streams. The voice stream stays within the LTE processor 460. The VPR module 495 is used to route packets between the Voice Engine 430 and the LTE bearer channel. The following actions are needed to start the video stream.
   a. There is control code in the Voice Engine 484 that sends a command to start the Video Engine 430. This command is passed to the Video Engine 430 via the VPMD module 490 and the VPAD module 420. From the time the Video Engine 430 is started by the Video Application 425 (in step 2 above), the Video Engine 430 is listening for such commands from the VPAD module 420.
   b. When the Video Engine 430 receives the start command from the VPAD module 420, the Video Engine 430 starts sending video packets.
   c. The video packets are sent to the VPR module 495 via VPAD 420/VPMD 490. The VPR module 495 then routes the packets to the appropriate video bearer channel.
   d. When the VPR module 495 receives a video packet (from the appropriate bearer channel), the VPR module 495 sends the video packet to the Video Engine 430 via VPMD 490/VPAD 420.
7. The video call is now active.

Use Case: Wi-Fi Video Call with Video Packet Redirector

The audio function of a video call over Wi-Fi™ behaves much like a VoIP call over Wi-Fi™ as described above. However, using the same data path within the mobile terminal for video call over the LTE network (described in the previous use case), the video data received by the Wi-Fi™ Daemon 415 would have to be passed down to the VPR module 495 in the LTE processor, and then re-routed back from the VPR module 495 to the Video Engine 430 (via VPMD 490/VPAD 420.) Similarly, all outgoing video packets would have to be sent from the Video Engine 430 down to the VPR module 495 in the LTE processor 460 and then back up to the Wi-Fi™ Daemon via VPMD 490/VPAD 420. This process of routing the video data through the LTE processor 460 is very inefficient. The Voice Packet Redirector 440 is introduced to alleviate this inefficiency.

With the Video Packet Redirector 440, the transport of audio and video data can also be split over different network (radio) interfaces. For example, it is possible to send audio data over the LTE audio bearer channel while offloading video to the Wi-Fi™ network.

After the mobile terminal 400 is registered with the service provider over Wi-Fi™, the mobile terminal 400 is ready to send and receive calls over Wi-Fi™. Listed below is a sequence of actions necessary to establish a video call over Wi-Fi™.

1. The user initiates a video call.
2. The Video Application 425 interacts with the CSI module 435 to create the video call, and starts up the Video Engine 430.
3. The CSI module 435 sends a command to the CSM module 475 via the VPAD module 420 and the VPMD module 490 to start the call.
4. The CSM module 475 sends the necessary SIP commands to the SIP module 488 to establish a video call.
5. The SIP commands in 4. are redirected by the VPR module 495 to the Wi-Fi™ Daemon 415 via the VPMD module 490 and the VPAD module 420.
6. When SIP events from the IMS core are received by the Wi-Fi™ Daemon 415, they are routed to the SIP module 488 via the VPAD 420/VPMD 490/VPR 495 path.
7. The CSM module 475 reports progress of the video call to the CSI module 435 via the VPMD module 490 and the VPAD module 420.

8. When the call is answered, the CSM module 475 sends a status update to the CSI module 435. In addition, the CSM module 475 starts the voice and video streams. The Wi-Fi™ Daemon is notified that specific network sockets must be opened so that both the voice and video stream are transported over Wi-Fi™
9. The following actions establish the voice stream.
    a. When the Voice Engine 484 creates a voice packet for transmission, the Voice Engine 484 sends the packet to the Wi-Fi™ Daemon via the VPMD module 490, the VPAD module 420, and the VPR module 495.
    b. When the Wi-Fi™ Daemon 415 receives a voice packet, the Wi-Fi™ Daemon 415 sends the voice packet to the Voice Engine 484 via the VPAD 420/VPMD 490/VPR 495 path.
10. The following actions establish the video stream.
    a. The Voice Engine 484 sends a command to the Video Engine 430 to start streaming. This command is passed to the Video Engine 430 via the VPMD module 490 and the VPAD module 420. From the time the Video Engine 430 is started up by the video application 425 (in step 2 above) the Video Engine 430 is listening for such commands.
    b. When the Video Engine 430 receives the command from the VPAD module 420 to start streaming, the Video Engine 430 starts sending video packets.
    c. The outbound video packets are sent to Voice Packet Redirector 440. Since the call uses the Wi-Fi™ interface, the Video Packet Redirector 440 sends the packets to the Wi-Fi™ Daemon 415. (If the call was over LTE, the video packets would be routed to the VPR module 495 via the VPAD 420/VPMD 490 path.)
    d. When the Wi-Fi™ Daemon 415 receives an inbound video packet, the Wi-Fi™ Daemon 415 sends the packet to the Video Engine 430 via the Video Packet Redirector 440.
11. The video call is now active.

One skilled in the art can readily understand that the above description of establishing a video call over Wi-Fi™ could be easily altered to establishing a video call using another form of an Alternate Network Interface by replacing the Wi-Fi™ Daemon with the other form of Alternate Network Interface Daemon, and including any necessary hardware changes.

Adding IM and Other RCS Features

Dual Registration Problem

One well known problem of providing Rich Communications Services (RCS) on the mobile device is the dual registration problem. If a user downloads multiple RCS applications on the mobile device, each application has its own IP Multimedia Subsystem (IMS) stack. Each stack must register with the IMS core to get access to RCS features. The IMS core is configured to allow only one registration per mobile device. When a second application tries to register with the service provider, a dual registration problem is encountered. Because each service provider (and its IMS core) handles this situation differently, the user may find that one, the other, or both applications do not function.

This problem is especially pronounced when the device has an LTE processor that is enabled for VoLTE. The LTE processor will try to register with the service provider (and its IMS core) at power up. This will occur before any other application gets a chance to register. Since a typical LTE processor does not provide full RCS functionality, additional applications are necessary required to access the missing RCS features, and these applications will not be able to register with the IMS core.

Another factor that causes the dual registration problem is the limited memory and CPU resources available on a typical LTE processor. The lack of memory space limits the number of SIP sessions that can be implemented on the LTE processor at the same time. SIP sessions that use Message Session Relay Protocol (MSRP) are particularly memory intensive. Such memory intensive functions need to be implemented on the application processor which has much larger memory space available. Examples of such sessions are RCS functions like IM and File Transfer. A technique of adding a Protocol Accelerator on the application processor to allow for a larger number of SIP sessions, and memory intensive SIP sessions to be implemented on the mobile device is disclosed. However, when a second SIP stack (the Protocol Accelerator) is implemented on the application processor, the dual registration problem described above is encountered.

A technique to avoid dual registration problems when RCS functions on a mobile device requires SIP protocol functions to be performed outside of the SIP stack embedded in the LTE processor is disclosed. To avoid this problem, all SIP protocol operations (e.g. voice, SMS, IM etc.) must share the same authenticated SIP connection. This can be accomplished by routing all SIP packets (from any SIP stack in the mobile device) through a network packet redirector module which maintains a single authenticated SIP connection to the IMS core. The network packet redirector also properly routes the incoming packets from the IMS core to the intended SIP stack in the mobile device as required.

Figure 6:
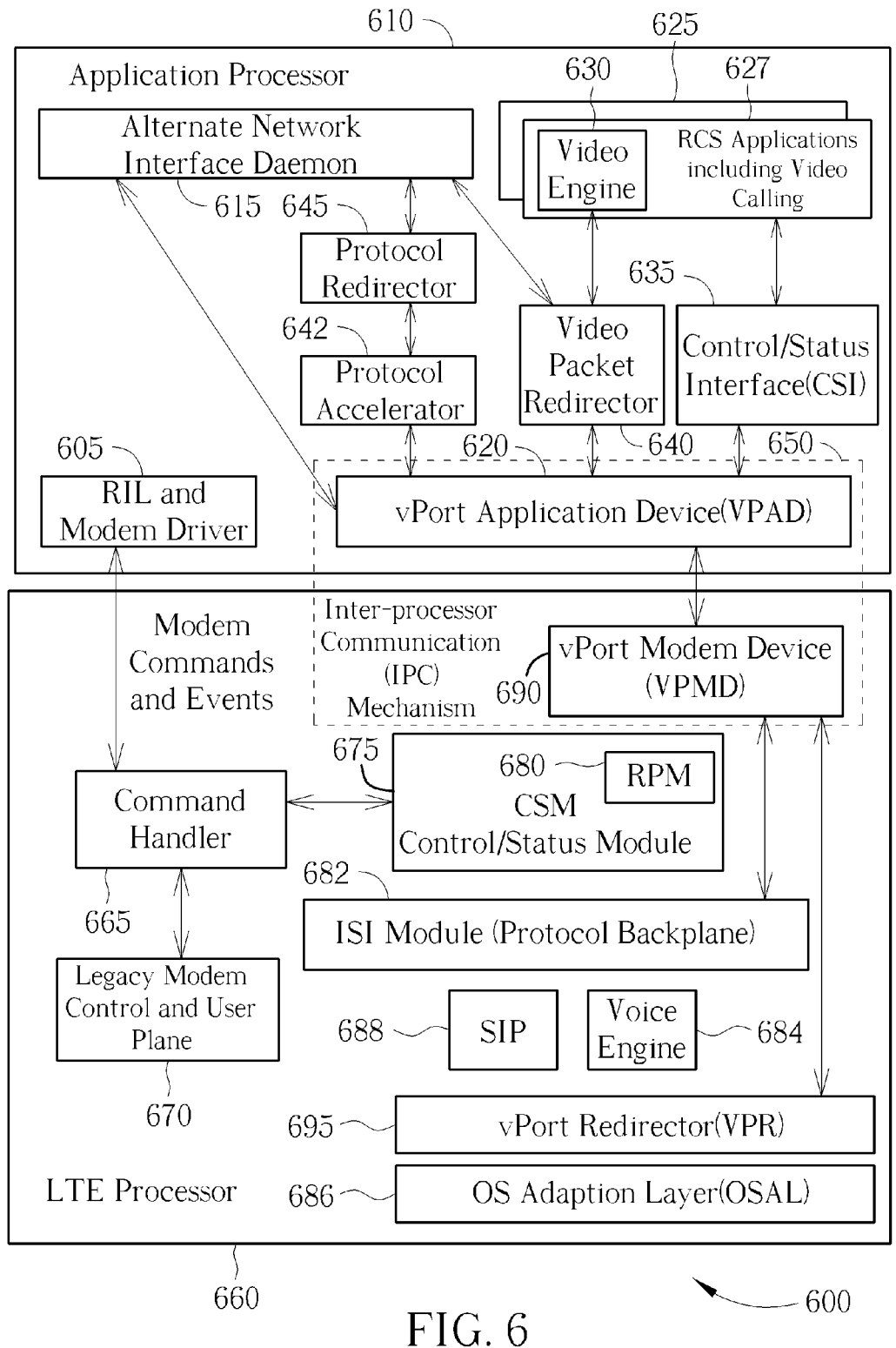
FIG. 6 is a functional block diagram illustrating redirection of traffic from the Protocol Accelerator for Wi-Fi™ Offload.

RCS packets may need to be offloaded to the Wi-Fi™ network in a mobile device that has RCS functions and an LTE processor with an embedded SIP sub-system (viz. VoLTE ready LTE processor). When RCS packets are to be transmitted over Wi-Fi™ (or any alternate network interface aside from the LTE radio), the network packet redirector module re-routes the data to the Wi-Fi™ Daemon on the application processor (via the inter-processor communication (IPC) mechanism so that they can be transmitted over Wi-Fi™, while maintaining the same authenticated SIP connection. Instead of redirecting SIP protocol data to the network packet redirector module on LTE processor as described, all SIP messages can be processed on the application processor using the protocol accelerator as shown in FIG. 6. All RCS packets thus processed are transmitted over the Wi-Fi™ via the Wi-Fi™ Daemon, avoiding extra data to be exchanged with the LTE processor.

Figure 5:
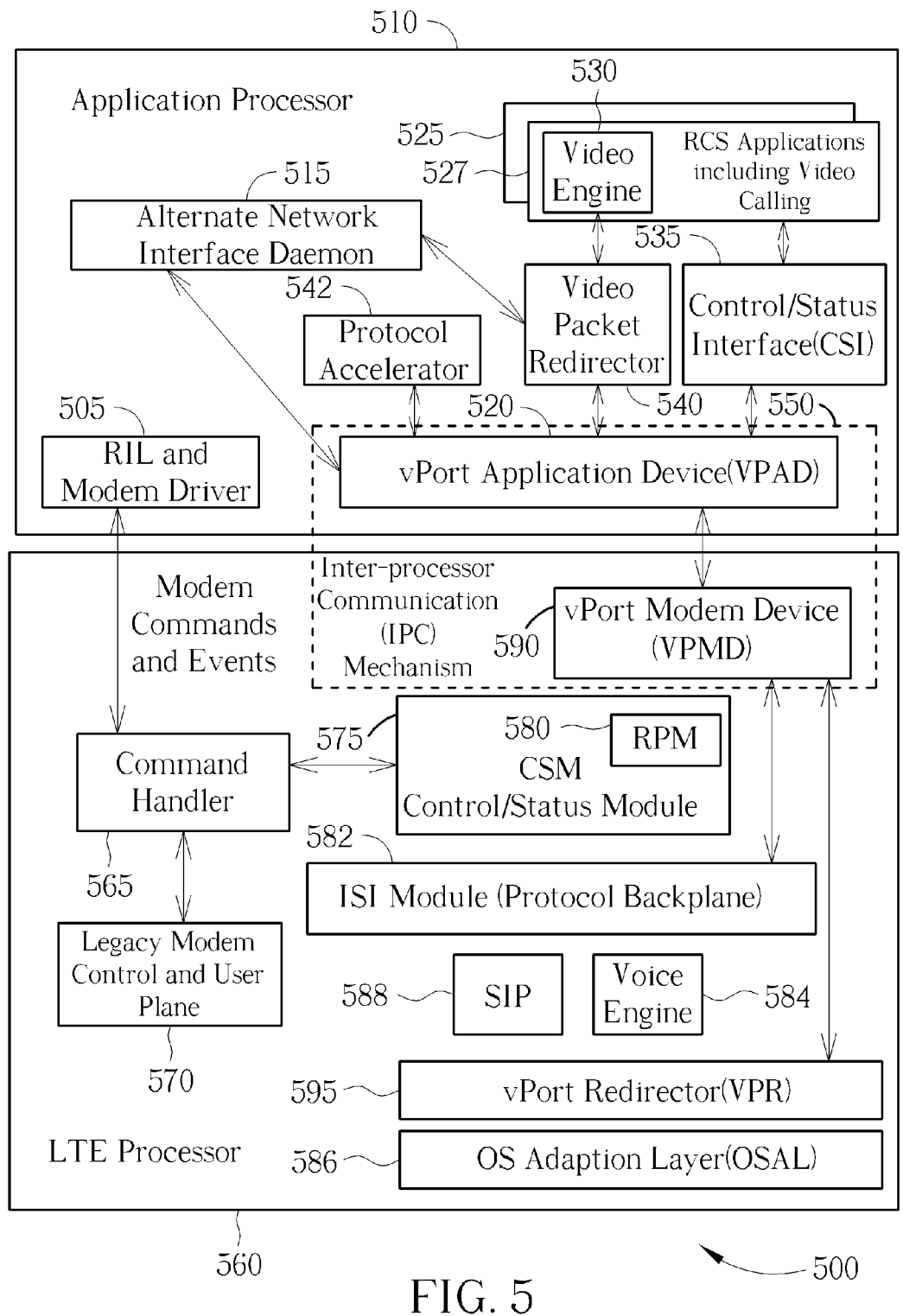
FIG. 5 is a functional block diagram showing the addition of RCS functions.

To enable RCS applications on the mobile device and to address the problems above, the following architecture is used as shown in FIG. 5.

The LTE processor 560 of the mobile terminal 500 comprises a Legacy Modem Control and User Plane module 570, a Command Handler 565, an Internet Service Interface (ISI) module 582, a Voice Engine module 584, a Session Initiation Protocol (SIP) module 588 (also referred to as SIP engine 588), an Operating System Abstraction Layer (OSAL) 586, a modified vPort Redirector (VPR) 595, a vPort Modem Device (VPMD) 590, and a Control/Status Module (CSM) 575. The CSM module 575 includes a Radio Policy Manager (RPM) module 580.

The application processor 510 of the mobile terminal 500 comprises a Video Application 525 which includes a Video Engine 530, a Video Packet Redirector 540, the RIL and Modem Driver 505, the Wi-Fi™ Daemon 515, and the vPort Application Device (VPAD) 520. The mobile terminal 500 differs from the mobile terminal 400 in that the mobile terminal 500 also includes a modified Control/Status Interface (CSI) module 535, a Protocol Accelerator module 542 (also referred to as Protocol Accelerator 542), and RCS Applications including video calling 527, and a modified VPR module 595. The vPort Modem Device (VPMD) 590 and the vPort Application Device (VPAD) 520 may be functionally considered together as an Inter-processor Communication (IPC) mechanism 550.

Support for RCS features does not change much of the design of the architecture, but modifications are made to some of the software modules.

The CSI module 535 is modified to provide IM, content sharing, file transfer, etc. The messages for these new features are passed to the CSM module 575. The data paths are unchanged. Therefore RCS applications continue to the use the same VoIP and SMSoIP software modules in the LTE processor.

Protocol Accelerator module 542: To address the memory and CPU issues for applications such as IM or file transfer, some protocol work need to be shifted to the application processor. One approach is to move the Message Session Relay Protocol (MSRP) protocol (the protocol used for IM messaging and file transfer) to the application processor. Another approach is to create a second SIP stack on the application processor along with MRSP. This second approach has the advantage of allowing a larger number of SIP sessions than the memory on the LTE processor would allow. The new module added to the design to support the offloading is the Protocol Accelerator 542 shown in FIG. 5. The Protocol Accelerator module 542 is attached to the ISI backplane 582 so that it appears to the CSM module 575 as a separate protocol engine that supports IM, file transfer, etc.

VPR 595: As discussed in previous sections, the VPR module 595 routes voice, and video and SMS protocol messages to the SIP engine 588 on the LTE processor 560. The VPR module 595 is updated so that it routes SIP packets to either the SIP engine 588 on the LTE processor or the Protocol Accelerator 542 on the application processor according to policy and availability of memory on the application processor and LTE processor. One such policy is to route all voice and SMS SIP messages to the SIP engine on the LTE processor, and route all remaining messages (messages that are not associated with voice, video, or SMS transactions) to the Protocol Accelerator module 542. By routing all SIP messages through the VPR module 595, all SIP messages (whether using the SIP engine 588 or the Protocol Accelerator 542) will use the same authenticated SIP connection.

How VPR Works

In order for the mobile terminal to provide network based real-time communications services, the SIP user agent on a mobile terminal 500 must register with the IMS core. Instead of the SIP module 588 directly opening a connection to the network, the SIP module 588 opens the connection by asking the VPR module 595 to open the connection to the network. The SIP module 588 registers to the IMS core using this VPR module 595 connection. Once this VPR module 595 connection has been registered with the IMS core, the VPR module 595 allows other SIP modules in the system (like the one in the Protocol Accelerator 542) to use this connection to the IMS core.

In addition to allowing multiple SIP modules to send messages to the IMS core, the VPR module 595 needs to route packets from the IMS core to the proper SIP stack. The VPR module 595 does this by inspecting the incoming packets. The VPR module 595 can be written to support different policies to handle the incoming packets. A typical policy for the architecture described in FIG. 5 is for the VPR module 595 to route SIP packets associated with voice and video call sessions to the SIP module 588 and all other packets to the protocol accelerator module 542.

Using this policy means that an incoming IM packet would be routed to the protocol accelerator module 542, while and incoming video calls would be routed to the SIP module 588.

The VPR module 595 allows a mobile terminal with an LTE processor that only has memory and CPU resources to support voice and video calls to support other RCS features using a second SIP stack (like the one in the protocol accelerator 542) without running into the dual-registration problem.

Use Case: IM over LTE

RCS IM (instant messaging) requires both SIP and MSRP protocols to send and receive messages. Listed below are the actions necessary to send a message from one user to another over LTE.

1. The mobile terminal 500 is authenticated by the IMS core (of the service provider) and ready to send and receive IM messages. This authentication is performed by the SIP module 588 via the VPR module 595 over the LTE radio network.
2. When the user wants to send a message, an RCS application 527 on the mobile terminal 500 commands the CSI module 535 to initiate the connection process.
3. The CSI module 535 contacts the CSM module 575 (via the VPAD 520/VPMD 590 path) to initiate a SIP messaging session with the remote party by sending an invitation to the message session. The invitation also includes the first IM message.
4. The CSM module 575 checks the RPM module 580 and finds out that the message should be sent over LTE.
5. Since the SIP session is for messaging, the CSM module 575 contacts the Protocol Accelerator module 542 (via the VPMD 590/VPAD 520 path) to initiate a new SIP session over LTE.
6. The Protocol Accelerator module 542 creates the SIP invite message and sends it to the VPR module 595 via the VPAD 520/VPMD 590 path.
7. The VPR module 595 sends said SIP invite message to the LTE network. By using the VPR module 595, the SIP message is able to share the authenticated SIP connection to the IMS core already set up by the SIP module 588 in step 1 above.
8. The IMS core sends the response to the invitation (in this case an acceptance). The VPR module 595 determines that this is part of the same message session initiated in step 6, and passes it up to the Protocol Accelerator module 542 for processing.
9. The Protocol Accelerator module 542 notifies the CSM module 575 that the invitation has been accepted.
10. The CSM module 575 passes the acceptance notification to the CSI module 535, which responds by telling the CSM module 575 to send an acknowledgement.
11. The CSM module 575 tells the Protocol Accelerator module 542 to acknowledge receipt of the acceptance.
12. The Protocol Accelerator module 542 sends an acknowledgment message to the IMS core via the VPR module 595.
13. The IM Session is now active. The CSI module 535 follows the acknowledgement message with the IM message (body.)
14. This IM message is passed to the CSM module 575.
15. The CSM module 575 sends the IM message to the Protocol Accelerator module 542.
16. The Protocol Accelerator module 542 sends the IM message to the LTE network using MSRP via the VPR module 595 (using the VPAD/VPMD IPC mechanism.)

17. When the IMS core receives the IM message, it sends it to the remote user.

Use Case: Video Content Sharing

Video content sharing requires exactly the same actions as a video call over LTE use case described above without a voice stream.

Use Case: File Transfer

File and image transfer are very similar to the IM over LTE use case described above. The main difference is that MSRP will break a single file transfer into multiple MSRP messages.

Optimization for Wi-Fi offload

Along with the Protocol Accelerator module 542 in FIG. 5 described above, Wi-Fi™ offload for voice, SMS, video and RCS functions can be further optimized by adding a Protocol Redirector software block as shown in FIG. 6.

The LTE processor 660 of the mobile terminal 600 comprises a Legacy Modem Control and User Plane module 670, a Command Handler 665, an Internet Service Interface (ISI) module 682, a Voice Engine module 684, a Session Initiation Protocol (SIP) module 688, an Operating System Abstraction Layer (OSAL) 686, a modified vPort Redirector (VPR) 695, a vPort Modem Device (VPMD) 690, and a Control/Status Module (CSM) 675. The CSM module 675 includes a Radio Policy Manager (RPM) 680.

The application processor 610 of the mobile terminal 600 comprises a Video Application 625 which includes a Video Engine 630, RCS Applications including video calling 627, a Video Packet Redirector 640, the RIL and Modem Driver 605, the Wi-Fi™ Daemon 615, the vPort Application Device (VPAD) 620, the modified Control/Status Interface (CSI) module 635, and a Protocol Accelerator module 642. The mobile terminal 600 differs from the mobile terminal 500 in that the mobile terminal 600 also includes a Protocol Redirector module 645. The vPort Modem Device (VPMD) 690 and the vPort Application Device (VPAD) 620 may be functionally considered together as an Inter-processor Communication (IPC) mechanism 650.

Protocol Redirector module 645: When a voice or video call or an RCS function is placed over Wi-Fi™, all SIP traffic can be redirected by the Protocol Redirector module 645 to be managed by the Protocol Accelerator module 642 on the application processor 610.

The following modules have been changed:

Wi-Fi™ Daemon 615: All SIP traffic is routed through the Protocol Redirector module 645 to the Protocol Accelerator module 642. Since there is only one active SIP stack connected to the IMS core, the dual registration problem is eliminated.

VPR module 695: This module no longer needs to route SIP traffic to the Wi-Fi™ Daemon because all Wi-Fi™ SIP sessions are managed by the Protocol Accelerator module 642. However, The VPR module 695 is still needed for routing voice traffic (processed by the Voice Engine 684) to the Wi-Fi™ Daemon.

FIG. 6 shows a complete system that can redirect protocol traffic to the Wi-Fi™ Daemon. A voice call is initiated the normal way (via AT command or CSI 635 command). The call is established using the SIP stack in the Protocol Accelerator module 642 instead of the SIP stack in the LTE processor 660. However, voice RTP traffic still originates and terminates in the LTE processor, using the Voice Engine 684. The RTP packet for voice is redirected to the Wi-Fi™ interface via the VPR module 695. For a video call over Wi-Fi™, the video packets are redirected to the Wi-Fi™ Daemon 615 via the Video Packet Redirector module 640.

Use Case: IM over Wi-Fi™ with Protocol Accelerator

Below are the actions necessary to send a message from one user to another over Wi-Fi™

1. After the mobile terminal 600 is authenticated by the IMS core, it is ready to send and receive IM messages.
2. When the user wants to send a message, the RCS application 627 commands the CSI module 635 to initiate the connection process.
3. The CSI module 635 contacts the CSM module 675 (via the VPAD 620/VPMD 690 path) to initiate a SIP messaging session with the remote party by sending an invitation to the message session. Included with the invitation is the first IM message.
4. The CSM module 675 checks the RPM module 680 and finds out that the message should be sent over Wi-Fi™
5. Since the SIP session is for messaging, the CSM module 675 contacts the Protocol Accelerator module 642 (via the VPMD 690/VPAD 620 path) to initiate a new session over Wi-Fi™.
6. The Protocol Accelerator module 642 creates the SIP invite message and sends it to the Protocol Redirector module 645.
7. The Protocol Redirector module 645 sends the SIP message to the Wi-Fi™ Daemon 615. By using Wi-Fi™ Daemon 615 with the Protocol Redirector module 645, the SIP message is able to share the authenticated SIP connection to the IMS core.
8. The IMS core sends back the response to the invitation (in this case an acceptance). The Wi-Fi™ Daemon 615 determines that this is part of the message session initiated in step 6 and passes it to the Protocol Redirector module 645.
9. The Protocol Redirector module 645 passes the message to the Protocol Accelerator module 642 for processing.
10. The Protocol Accelerator module 642 notifies the CSM module 675 that the invitation has been accepted.
11. The CSM module 675 passes this to the CSI module 635.
12. The Protocol Accelerator module 642 sends the acknowledge message to the IMS core using the Protocol Redirector module 645. The Protocol Redirector module 645 sends the IM message to the Wi-Fi™ Daemon 615 for transmission to the network.
13. The IM Session is now active. The CSI module 535 follows the acknowledgement message with the IM message (body.)
14. The IM message is passed to the CSM module 675.
15. The CSM module 675 sends the IM message to the Protocol Accelerator module 642.
16. The Protocol Accelerator module 642 sends the IM message using MSRP.
17. The MRSP message is sent to the network through the Wi-Fi™ Daemon 615 (accessed through the Protocol Redirector module 645).
18. When the IMS core receives the message, it passes it to the remote user.

One skilled in the art can readily understand that the above description of optimizing and adding IM messages using Wi-Fi™ could be easily altered to optimizing and adding IM messages using another form of an Alternate Network Interface by replacing the Wi-Fi™ Daemon with the other form of the Alternate Network Interface Daemon, and including any necessary hardware changes.

SUMMARY

This document describes a complete software system for adding VoLTE, video, RCS support, and Wi-Fi™ offload to a mobile terminal. Each of the embodiments builds on the physical and functional components shown in FIG. 2. They start by adding VoLTE to a LTE processor. The final section (FIG. 6) describes a full featured system that includes voice and video calling, SMS over IP, RCS features (IM, file transfer, content share etc.) and Wi-Fi™ offload. Because of the modular approach, it is relatively easy to provide subsets of this fully featured system using the same design and software blocks, and these subsets and/or combinations are considered part of the invention. For example, FIG. 2 is a basic product for just VoLTE and SMSoIP and SRVCC, whereas FIG. 3 adds Wi-Fi™ offload, and FIG. 4 adds Video call, etc.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of making Voice over Internet Protocol (VoIP) calls, legacy circuit calls, and sending/receiving Short Message Service (SMS) using a Long Term Evolution (LTE) modem or a legacy modem, switching between the LTE and the legacy modem on a mobile terminal with both LTE and legacy modems, and providing all legacy modem functions using existing applications on the mobile terminal, the method comprising:

a Session Initiation Protocol module (SIP) and Control/Status Module (CSM) subsystem making VoIP calls and sending/receiving SMS over Internet Protocol (SMSoIP) on an LTE processor;

a Command Handler module directing voice and SMS messages from a modem driver to the SIP/CSM, and passing all other messages to the legacy modem directly;

the CSM module determining, based on radio policy set by a network or the mobile terminal, whether the call or SMS will be processed by the SIP module and a Voice Engine as required or be passed to the legacy modem and processed by voice algorithms embedded in the legacy modem;

the Command Handler module directing voice and SMS messages from the legacy modem to the SIP/CSM, and passing all other messages through to the modem driver;

selecting the radio policy for Rich Communications Services (RCS) on the mobile terminal on a per function basis either by the mobile terminal or an operator of the network; and determining which network interface to use for each RCS function by making accessible to either the network or the mobile terminal a Radio Policy Manager (RPM) to set parameters or rules for making the determination.

2. A method for dynamic selection of network interface in a mobile terminal capable of Rich Communications Services (RCS), Long Term Evolution (LTE) modem, legacy modem, and an alternate network interface, the method comprising:

a Radio Policy Manager (RPM) on an LTE processor of the mobile terminal, the RPM selecting what network interface to use for each communication function;

making the RPM accessible to a network operator or the mobile terminal to set parameters or rules for making the determination;

a vPort Redirector (VPR) module on the LTE processor requesting access to an LTE video bearer channel;

a Control/Status module (CSM) module using the RPM to set the alternate network interface to be used by video packets and control packets;

routing the video packets through the VPR with CSM controlling which alternate network interface is used for the video packets; and the VPR redirecting the video packets to an alternate network interface Daemon when the video packets are to be transmitted over the alternate network interface.

3. A method for Session Initiation Protocol module (SIP) sessions on a mobile terminal to be directed to different corresponding network interfaces using a single authenticated SIP connection, the method comprising:

a vPort Redirector (VPR) module, between an SIP stack and an alternate network interface, providing a virtual network interface, which redirects all SIP packets according to a radio policy selected either by the mobile terminal or an operator of the corresponding radio network;

a Control/Status module (CSM) module using an RPM to set the alternate network interface to be used by video packets and control packets;

routing the video packets through the VPR with CSM controlling which alternate network interface is used for the video packets; and the VPR redirecting the video packets to an alternate network interface Daemon when the video packets are to be transmitted over the alternate network interface.

4. A method of redirecting real-time Internet Protocol (IP) communication IP packet traffic which normally goes through a Voice-over-Long-Term Evolution (VoLTE) enabled Long Term Evolution (LTE) processor on a mobile terminal to an alternate network interface without duplicating another Session Initiation Protocol module (SIP) stack and related software outside of the LTE processor, the method comprising:

inserting a vPort Redirector (VPR) module between the SIP stack and the VoLTE enabled LTE processor which redirects all IP packets that are normally transmitted over the LTE modem to an alternate network interface Daemon using an inter-processor communication mechanism;

the alternate network interface Daemon interfacing with a sub-system to maintain a network connection established by the alternate network interface Daemon, and transmitting/receiving the IP packet traffic over the network connection established by the alternate network interface Daemon, wherein all the IP packet traffic goes through an authenticated SIP connection substantially the same as used for VoLTE transmission;

a Control/Status module (CSM) module using an RPM to set the alternate network interface to be used by video packets and control packets;

routing the video packets through the VPR with CSM controlling which alternate network interface is used for the video packets; and the VPR redirecting the video packets to an alternate network interface Daemon when the video packets are to be transmitted over the alternate network interface.

5. A method of redirecting video packets that are produced and/or consumed by an application processor that performs video codec functions to a Long Term Evolution (LTE) processor of a mobile terminal when video packets are to be transported over an LTE modem, the method comprising:

a video engine running on the application processor sending and receiving video packets to/from the LTE processor;

a vPort Redirector (VPR) module on the LTE processor requesting access to a LTE video bearer channel;

exchanging the video packets between the video engine and the VPR using an inter-processor communication (IPC) mechanism;

a Control/Status module (CSM) module using a Radio Policy Manager (RPM) to set an alternate network interface to be used by the video packets and control packets;

routing the video packets through the VPR with CSM controlling which alternate network interface is used for the video packets; and the VPR redirecting the video packets to an alternate network interface Daemon when the video packets are to be transmitted over the alternate network interface.

6. The method of claim 5 further comprising a Video Packet Redirector redirecting video packets to either an alternate network interface Daemon or the LTE modem as determined by the Control/Status module (CSM) module using the Radio Policy Manager (RPM).

7. A method of distributing Session Initiation Protocol (SIP) functions across different processors while maintaining a single authenticated SIP connection for a mobile terminal, the method comprising:

providing a vPort Redirector module (VPR) on a Processor of the mobile terminal;

an SIP module on the Processor requesting the VPR module to open an SIP connection to an Internet Protocol Multimedia Subsystem (IMS) core;

the SIP module registering to the IMS core using the VPR module connection;

the VPR module allowing other SIP modules on different processors in the mobile terminal to use the same VPR module connection to the IMS core;

the VPR module inspecting SIP packets coming from the IMS core to determine a corresponding SIP module for each SIP packet; and the VPR module routing the SIP packets to the corresponding SIP module.

8. The method of claim 7 further comprising the VPR module routing SIP packets associated with voice and video call sessions to a first SIP module on the processor and all other packets to a protocol accelerator module running on an application processor of the mobile terminal.

9. The method of claim 7 further comprising the VPR module routing all messages that require Message Session Relay Protocol (MSRP) processing to an MSRP stack on one processor, and all other SIP messages to a SIP stack on a different processor.

10. A method for implementing Rich Communications Services (RCS) functions on a mobile terminal with a Long Term Evolution (LTE) processor using an Internet Protocol (IP) connection established by a Session Initiation Protocol (SIP) module in the LTE processor, the method comprising:

implementing a protocol accelerator on an application processor of the mobile terminal providing SIP functions;

a Control/Status Module (CSM) determining which SIP function is to be performed by the SIP module in the LTE processor and which SIP function is to be implemented on the protocol accelerator, and routing RCS data via a vPort Redirector module (VPR) in the LTE processor to the protocol accelerator or to the SIP module in the LTE processor according to the determination, wherein SIP functions that are required to be performed on the SIP module in the LTE processor are routed to the SIP module in the LTE processor so that RCS data is transmitted over a same authenticated SIP connection established by the SIP module in the LTE processor for Voice-over-Internet-Protocol (VoIP) and Short Message Service (SMS); and the CSM determining which SIP function is to be performed by the SIP module in the LTE processor and which SIP function is to be implemented on the protocol accelerator according to any one or any combination of the following: amount of memory required by the SIP function including Message Session Relay Protocol (MSRP) functions, amount of memory available on the application processor or the LTE processor, and amount of available CPU on the application processor and LTE processor of the mobile terminal.

11. The method of claim 10 further comprising implementing only MSRP functions in the protocol accelerator on the application processor, and the VPR module in the LTE processor routing all messages that require MSRP to the protocol accelerator, and all other SIP messages to the SIP module in the LTE processor.

12. A method of avoiding dual registration problems when Rich Communication Services (RCS) functions on a mobile terminal having a Long Term Evolution (LTE) processor require Session Initiation Protocol (SIP) functions to be performed outside of an SIP stack embedded in the LTE processor, the method comprising:

the LTE processor registering with a network and establishing an authenticated SIP connection to an Internet Protocol Multimedia Subsystem (IMS) core for Voice-over-Internet-Protocol (VoIP) and Short Message Service over Internet Protocol (SMSoIP);

routing all Internet Protocol (IP) packets for subsequent RCS functions processed by a protocol accelerator on an application processor, and are destined for transmission through an LTE modem, through a vPort Redirector (VPR) of the LTE processor which maintains a single authenticated SIP connection to the IMS core;

routing incoming packets from the IMS core, received via the LTE modem over the authenticated SIP connection, through the VPR to the SIP stack embedded in the LTE processor or to the protocol accelerator in the application processor of the mobile terminal as required; and in response to RCS packets being transmitted over an alternate network interface aside from an LTE network interface, the VPR re-routing via an inter-processor communication (IPC) mechanism the RCS packets after modification to an alternate network interface Daemon in the application processor and transmitting the RCS packets over the alternate network interface, while maintaining the single authenticated SIP connection.

13. The method of claim 12 wherein the LTE processor is Voice-over-Long-Term-Evolution (VoLTE) ready and includes an embedded SIP subsystem, the method further comprises:

in response to RCS packets being transmitted over an alternate network interface aside from an LTE radio, processing all SIP messages on the application processor using the protocol accelerator of the application processor, and routing the RCS packets to the alternate network interface Daemon in the application processor so that the RCS packets can be transmitted over the alternate network interface, over the single authenticated SIP connection and without extra data exchange between the application processor and the LTE processor.

* * * * *